United States Patent [19]

Faase et al.

[11] Patent Number: 5,477,889
[45] Date of Patent: Dec. 26, 1995

[54] HEDDLE FRAME ENDBRACE ASSEMBLY

[75] Inventors: Gene E. Faase, Taylors; Michael T. King, Williamston, both of S.C.

[73] Assignee: Steel Heddle Mfg. Co., Greenville, S.C.

[21] Appl. No.: 357,937

[22] Filed: Dec. 16, 1994

Related U.S. Application Data

[63] Continuation-in-part of Ser. No. 168,754, Dec. 16, 1993, Pat. No. 5,411,061.

[51] Int. Cl.⁶ ................................................. D03C 9/06
[52] U.S. Cl. ............................................................ 139/91
[58] Field of Search .............................. 138/140; 139/91

[56] References Cited

U.S. PATENT DOCUMENTS

| | | | |
|---|---|---|---|
| 1,637,796 | 8/1927 | Andrews | 139/91 |
| 3,901,281 | 8/1975 | Morrisey | 138/140 |
| 4,275,772 | 6/1981 | Shimizu | 139/91 |
| 5,335,699 | 8/1994 | Beyaert et al. | 139/91 X |

*Primary Examiner*—Andy Falik
*Attorney, Agent, or Firm*—Dority & Manning

[57] ABSTRACT

A heddle frame endbrace assembly is provided which substantially eliminates bowing and distortion of the endbrace when placed under a pre-tension condition. The endbrace includes an elongated body formed of a first material. The body has a longitudinal channel defined therein along the length of the body. The channel is configured for receipt of a drive bolt therethrough. An insert is fitted into and essentially lines the channel from one end of the body to the other. The insert is formed of a second material having a greater stiffness than the first material. The endbrace has an overall longitudinal balanced moment axis through the channel so as to be essentially coaxial with a longitudinal centerline axis of a drive bolt disposed through the channel, wherein upon tensioning of such a drive bolt, the endbrace is prevented from bowing.

15 Claims, 7 Drawing Sheets

HEDDLE FRAME ENDBRACE ASSEMBLY

This application is a continuation-in-part of application Ser. No. 08/168,754, filed Dec. 16, 1993, now U.S. Pat. No. 5,411,061.

BACKGROUND OF THE INVENTION

The present invention relates to high speed weaving machines or looms, and more particularly to the heddle frames and endbrace assemblies used in such high speed weaving machines.

Typically, heddle frames used in high speed weaving looms comprise a pair of end braces configured with a pair of laterally extending rails or slats. The connection between the end braces and slats is critical for proper operation of the weaving machines and has been a source of persistent problems in the field. In the past, the end braces have been rigidly attached to the top and bottom of the slates. The end braces were then free to slide in a guiding groove on a support of the weaving machine to form a shed during weaving operations. With the advent of high speed weaving machines, which may make as many as six hundred or more sheds per minute, the reciprocating motion of the heddle frame was very rapid and the inertia of the heddle frame, owing to its weight, was very great. This caused frequent breaking of the heddle frames, particularly at the connection between the end braces and top and bottom slats.

Conventionally, the top and bottom slats of the heddle frame have been made of lightweight hollow aluminum beams. The end braces are then fitted to the hollow aluminum beams. However, the aluminum slats or rails are subjective to a substantial amount of bending which exerts a flexing movement on the connection between the end braces and the slats. This flexing action results in fatigue of the components comprising the connection between the end braces and the slats, thereby causing frequent failure of the heddle frames.

Several attempts have been made to provide improved heddle frames. For example, U.S. Pat. No. 4,750,526 describes a quick release connection provided between the end braces and the laterally extending cross rails. This device utilizes a connector which is fixed within an opening in the cross rail having means for compressively gripping a projection which extends at a right angle from the end brace.

Another attempt to overcome the problems with conventional heddle frames is shown in U.S. Pat. No. 4,022,252. In this patent, the end brace has a metal core, a portion of which is covered with plastic to provide additional strength. A pair of joining pieces project from the strengthened portion of the core of the end brace as one body and form a tapered groove there between. These projections extend into the hollow body of the cross rail. The end brace is anchored to the cross rails by means of a wedge shaped member which is attached to the end brace by screws. The wedge shaped member enters the tapered groove formed by the projecting pieces so as to force the projecting pieces against the side walls of the cross rail, thereby locking the end brace firmly to the cross rail.

U.S. Pat. No. 4,230,159 describes a heddle frame wherein the end brace is joined to the cross rail by means of a plastic projection which extends into the hollow space of the cross rail and is pinned to the cross rail by a single pin which permits the projection to pivot about the pin thereby providing a flexible joint. A packing material is packed in the space between the end brace and across rail. This device permits flexibility of the joint but cannot be readily disassembled for drawing in of the work yarns or for replacement of component parts.

Thus, although a number of attempts have been made to provide a more reliable connection between the end brace and cross rails, such connections have only been achieved through relatively complicated and not easily disassembled connecting assemblies which do not provide adequate strength for the frame. For example, conventional connecting screws that extend through the end brace in a parallel or perpendicular direction tend to create relatively high stress points which are susceptible to failure in a relatively short time. Additionally, the location of drive elements on modern weaving machines overlaps and thereby prevents the use of several existing screw locations of conventional connecting assemblies.

The present invention provides a quick change end brace connection having extremely high fatigue resistance that eliminates the known disadvantages as discussed above.

OBJECTS AND SUMMARY OF THE INVENTION

It is a principle object of the present invention to provide an improved heddle frame having a quick change connecting assembly between the end braces and lateral slats wherein replacement of parts and drawing in of warped yarns is facilitated with minimum structural components.

Yet another object of the present invention is to provide a heddle frame connecting assembly which is able to absorb the loads and internal stresses created in high speed weaving machines without fatigue failure of the components thereof.

Still a further object of the present invention is to provide a readily disassembled connecting assembly for a heddle frame which may incorporate conventional drive elements thereby eliminating multiplicity of components and unnecessary weight.

Another object of the present invention is to provide an improved heddle frame endbrace assembly which does not distort or bow when placed under a pre-tension condition.

Additional objects and advantages of the invention will be set forth in part in the description which follows, and in part will be obvious from the description, or may be learned by practice of the invention.

In accordance with the invention, the heddle frame is provided having a pair of laterally extending slats and a pair of end braces connected to the slats to form a generally rectangular frame. The lateral slats have elongated openings or recesses defined within the ends thereof. Preferably, the slats are hollow. The end braces include an inwardly directed extension foot formed thereon generally where the end brace meets the slat. The extension foot has the width so as to be slidable within the elongated opening in the slat. A single locking member is operably configured to lock the extension foot within the slat in a tightened position and to release the end brace from the slat in a loosened position. The locking member is disposed through the extreme outward edge of the slat and extends into the elongated opening of the slat. In a preferred embodiment, the locking member comprises a threaded bolt, or like threaded instrument.

In one preferred embodiment of the invention, the locking member physically engages with the extension foot formed on the end brace. In this embodiment, the extension foot may comprise a hole defined therein for receiving the bolt. The extension foot may further include a metal insert carried therein, the bolt extending through the hole into the metal insert for threaded engagement therewith.

In another preferred embodiment of the invention, the locking member may indirectly engage with the extension foot of the end brace through an independent clamp block. The clamp block has a width so as to be slidable within the elongated opening within the end of the slat and includes a recess defined therein for receiving the extension foot. The locking member physically engages the clamp block to secure the clamp block relative to the slat. In this manner, the extension foot is in turn secured within the clamp block recess and thereby fixed relative to the slat. Preferably, the clamp block recess and extension foot comprise adjacent slanted surfaces, or dove-tail sections. These slanted surfaces prevent the end brace from being pulled away from the slat once the locking member is tightened.

Preferably, the drive element of the heddle frame is incorporated with the connecting assembly. For example, the drive element may comprise a element which is formed on the extreme end of the end brace, preferably formed integral therewith. In an alternative embodiment, the drive element is disposed along a portion of the edge of the slat. In this embodiment, the locking member also locks the drive element to the slat. For example, the locking member may extend through the drive element and slat and into the extension foot in one embodiment, and into the clamp block in an alternative embodiment.

Whichever embodiment of the clamp block, drive element, or locking member, the end brace is easily separable from the slat merely by removing or loosening the locking member. For example, where the locking member comprises a threaded bolt or quick disconnect bolt, it need merely be loosened to separate the end brace from the slat. For example, in the embodiment wherein the clamp block is used to secure the extension, the threaded bolt is loosened to an extent wherein the end brace extension is released from the clamp block recess. In the embodiment wherein the threaded bolt extends through a hole in the extension foot into the metal insert carried thereby, the threaded bolt is loosened and removed to allow the end brace to be withdrawn from the slat. In the embodiment wherein the clamp block is utilized, the block may include an elongated relatively flexible portion rigidly connected to the slat. In this embodiment, the locking member can be loosened so that the end brace can be separated from the slat while the clamp block remains connected within the slat, the elongated flexible element allowing enough movement of the clamp block within the slat so as to release the extension foot from the recess.

The present invention also relates to an inventive endbrace assembly which overcomes a significant problem with conventional endbrace assemblies. In a preferred embodiment, the heddle frame endbrace comprises an elongated body having opposite ends. The body has a longitudinal channel defined therein along the length of the body. The channel is configured for receipt of a drive bolt through the endbrace. The endbrace further comprises a continuous insert fitted into the channel which essentially lines the channel from one end thereof to the other. The insert is formed of a material having a greater stiffness than that of the elongated body. The insert also has a weight so that the endbrace has an overall longitudinal balanced moment axis through the channel. This balanced moment axis essentially is coaxial with a longitudinal centerline axis of a drive bolt which may be disposed through the channel. In this manner, upon tensioning of the drive bolt disposed through the channel, the forces are transmitted through the balanced moment axis of the endbrace thereby preventing bowing or distortion of the endbrace. Since a moment force is not generated because of any offset between the bolt axis and the moment axis of the endbrace.

In a preferred embodiment of the inventive endbrace assembly, the body is formed of a fiber reinforced composite material and the insert is formed of steel. Preferably, the channel comprises a generally U-shaped profile defined in the body and the insert comprises a corresponding U-shaped profile.

In a further embodiment of the endbrace, removable mounting brackets are disposed at each end of the body and the insert is disposed essentially between and in contact with the mounting brackets. The mounting brackets are configured for receipt of a drive bolt therethrough. In this manner, the tension forces of the drive bolt are transmitted directly to the insert through the mounting brackets.

The present invention also includes a heddle frame incorporating the inventive endbrace assemblies just described. This heddle frame may also incorporate the features of the releasable endbraces already discussed.

DETAILED DESCRIPTION OF THE PREFERRED EMBODIMENTS

Figure 1:
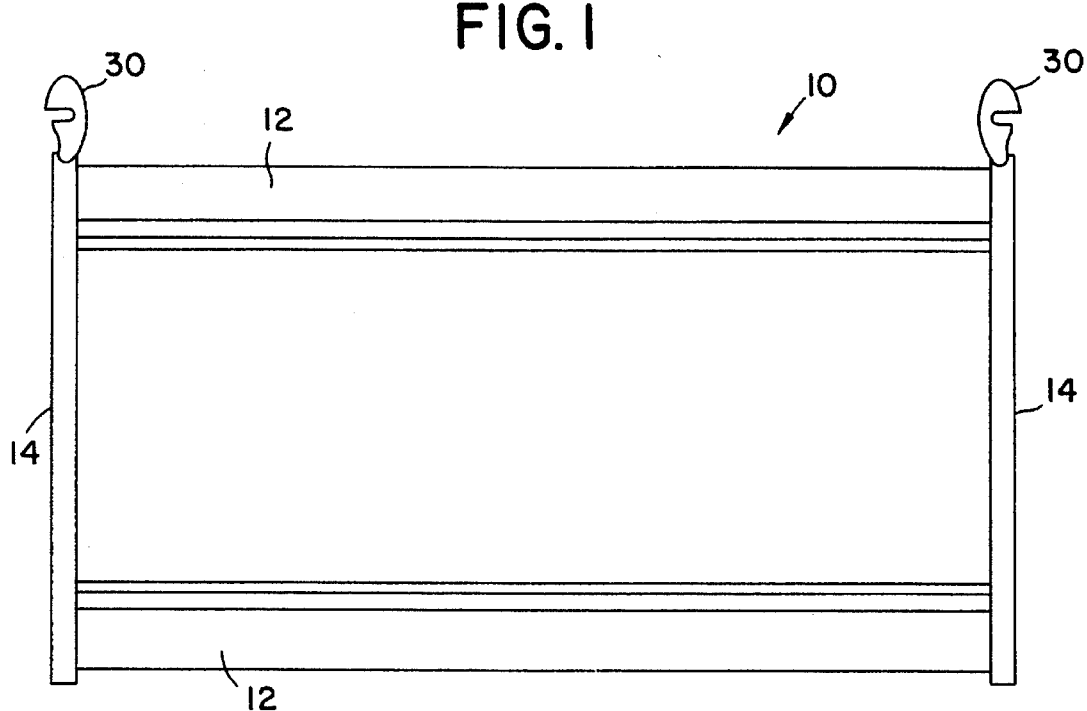
FIG. 1 is a perspective view of a heddle frame in general.

Reference will now be made in detail to the presently preferred embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. The numbering of components in the drawings is consistent throughout the application, with the same components having the same number in each of the drawings.

Figure 2:
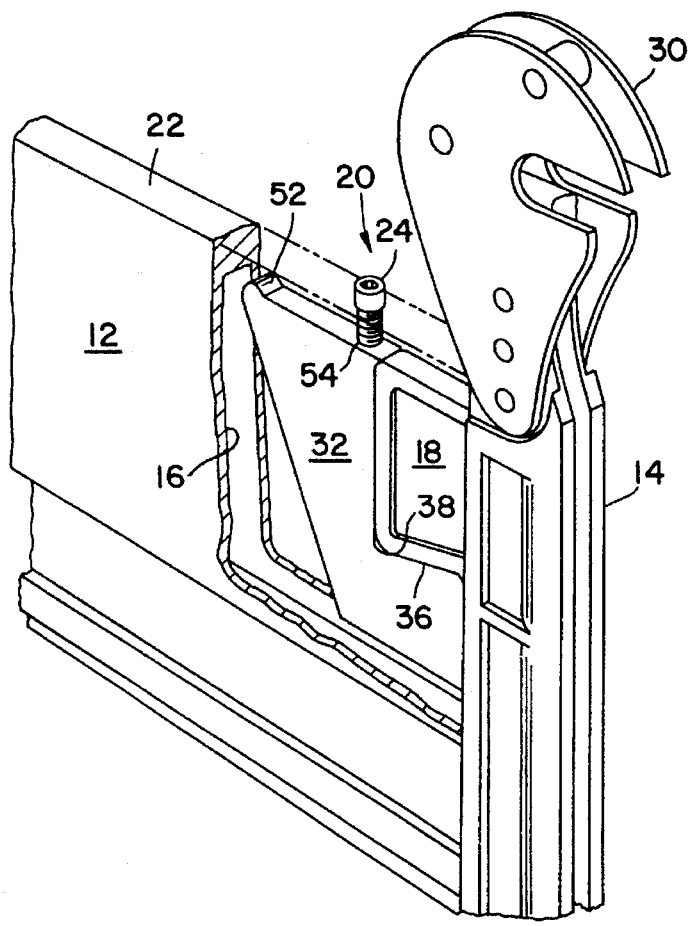
FIG. 2 is a partial cut-a-way view of a connecting assembly utilized in the heddle frame of FIG. 1.

Referring to FIGS. 1 and 2 in particular, the present invention includes a heddle frame 10. As is commonly understood, heddle frame 10 includes a pair of laterally extending slats 12 between a pair of end braces 14. The slats are connected to the end braces to form a generally rectangular frame. Slats 12 include an elongated opening 16 defined within the end of the slat. Preferably, slats 12 are formed of aluminum and are hollow. In this case, opening 16 extends throughout the entire length of slat 12. Slats 12 may also be formed of any suitable light weight rigid material.

End braces 14 according to the invention may also be formed of aluminum. In a preferred embodiment, end braces 14 are formed of a reinforced composite material, for example a fiber reinforced plastic material. Any number of such materials are known in the art and may be suitable for the present invention. End braces 14 have an inwardly directed extension foot 18 configured thereon. Foot 18 is preferably formed integral with end brace 14 but, may comprise a separate component fixed thereto. Foot 18 is inwardly extending in that it is preferably oriented perpendicular to the longitudinal line of the end brace and is directed inwardly towards the interior of the heddle frame 10. Foot 18 also has a width which is less than the opening 16 defined in slat 12. In this manner, foot 18 is slidable within slat 12.

Extension foot 18 can take on any manner of shape. However, in preferred embodiments of the invention, foot 18 has at least one slanted or angled surface 38, as particularly seen in FIGS. 2 and 3. Surface 38 is angled or slanted with respect to a horizontal line drawn through the extension foot 18. Surface 38 may be considered as a dove-tail or partial dove-tail configuration. Although the figures only depict one side of foot 18 as having such a slanted or angled surface, it is within the scope of the invention that any number of the sides of 18 be formed with the inner locking slanted surface. For example, the entire extension foot 18 may be configured as a dove-tail or like configuration. As will be explained further on, extension foot 18 comprises the element by which end brace 14 is indirectly fixed to slat 12. Depending on the manner in which foot 18 is secured within end brace 12, any manner of configuration or shape of foot 18 is possible.

The invention also includes a releasable locking member, generally 20, which is operably configured to lock extension foot 18 within slat 12 in a locked position thereof, and to easily and readily release end brace 14 from slat 12 when in a released or unlocked position. Locking member 20 is disposed through the extreme outward edge 22 of the slat and extends into elongated opening 16 of slat 12, as particularly seen in FIGS. 2 and 3. In a preferred embodiment of the invention, locking member 20 comprises a threaded bolt 24. Bolt 24 may comprise for, for example, a hex bolt. However, it should be understood that any manner of engaging or locking pin or like device may be used.

Figure 6:
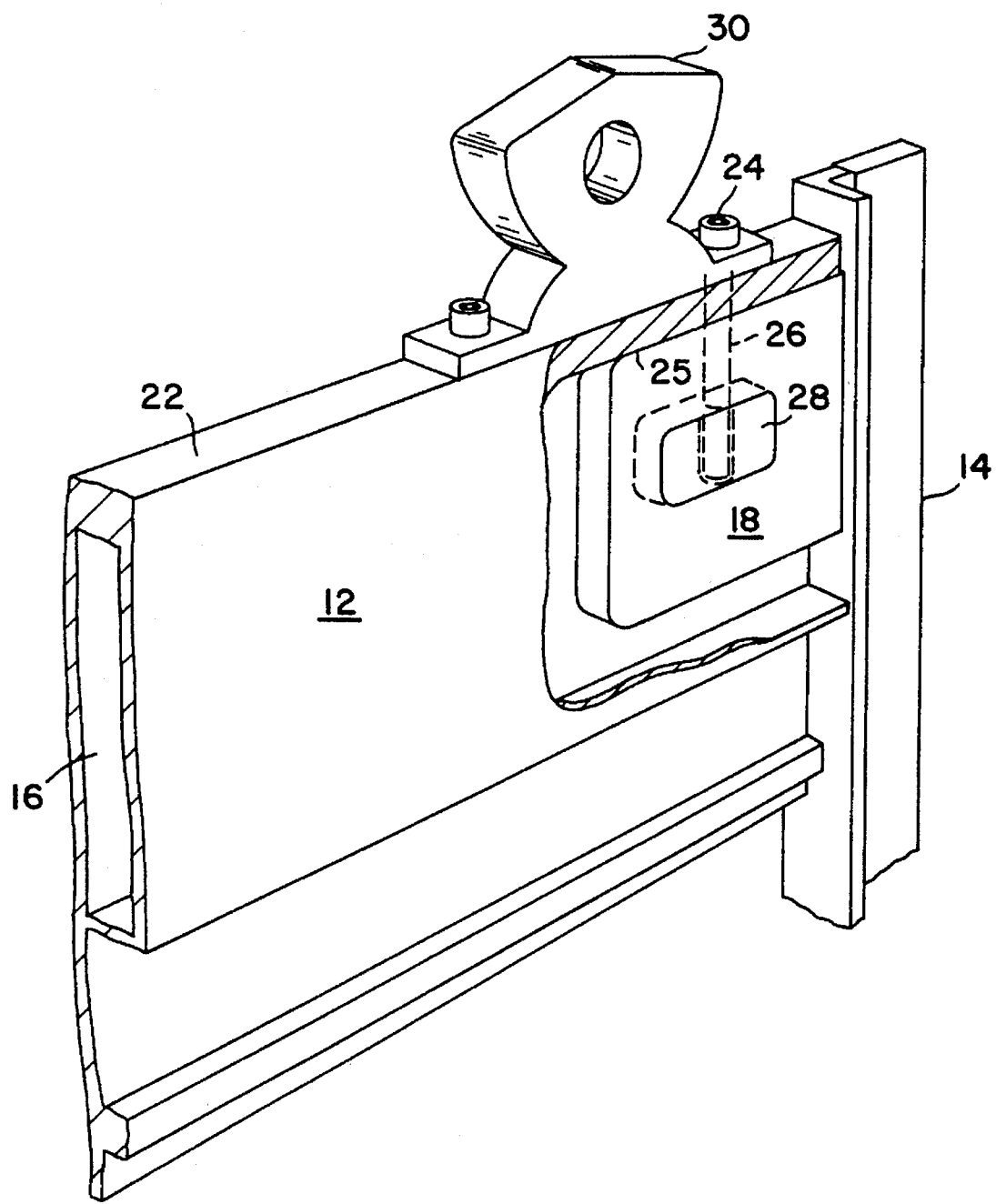
FIG. 6 illustrates an embodiment of the connecting assembly according to the invention wherein the locking member directly engages the extension foot of the end brace.

In one preferred embodiment, bolt 24 directly physically engages extension foot 18 of end brace 14. This embodiment is particularly illustrated in FIG. 6. Referring to FIG. 6, extension foot 18 includes an upper facing surface 25 which, when foot 18 is inserted within slat 12, is adjacent the outer edge 22 of slat 12. A hole 26 is defined in foot 18 for receipt of threaded bolt 24. Bolt 24 extends through the edge 22 of slat 12 into foot 18. To increase the reliability of bolt 24 and provide a better biting surface therefor, a metal insert 28 is preferably embedded within foot 18. Insert 28 has a threaded hole defined therein for receipt of bolt 24. In an alternative embodiment however, hole 26 within foot 18 may itself be threaded.

Figure 4:
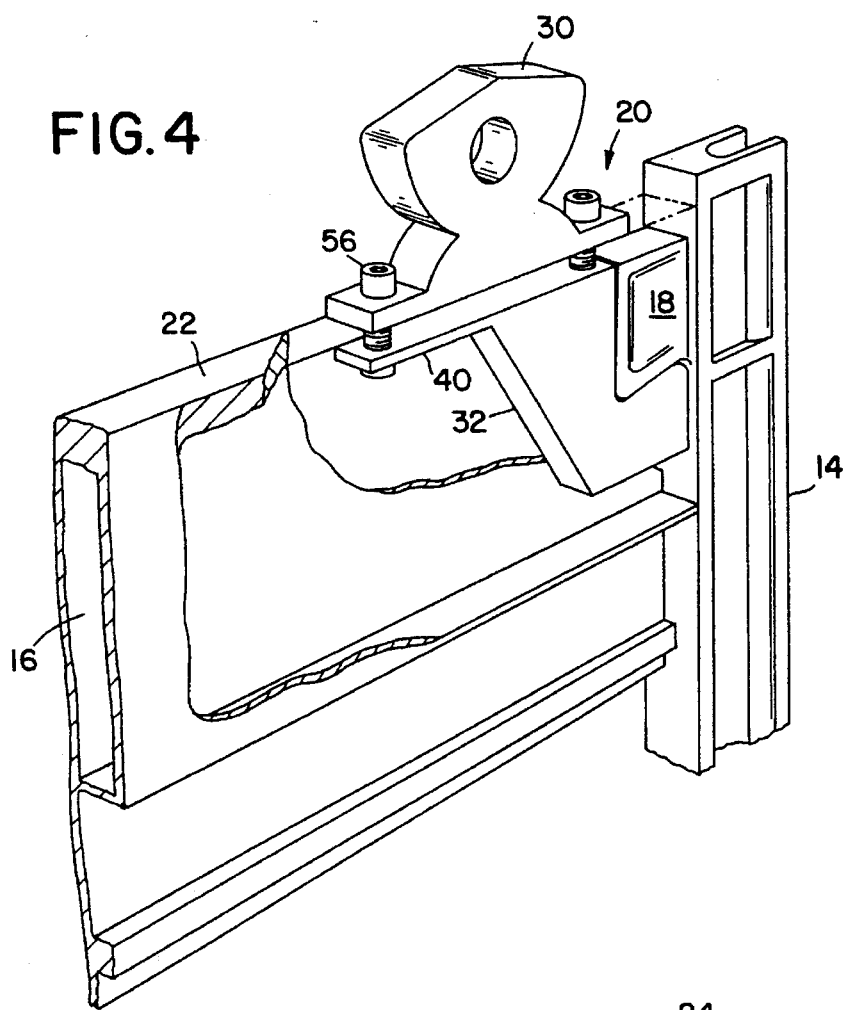
FIG. 4 illustrates a partial cut-a-way view of an alternative embodiment of the connecting assembly.
Figure 5:
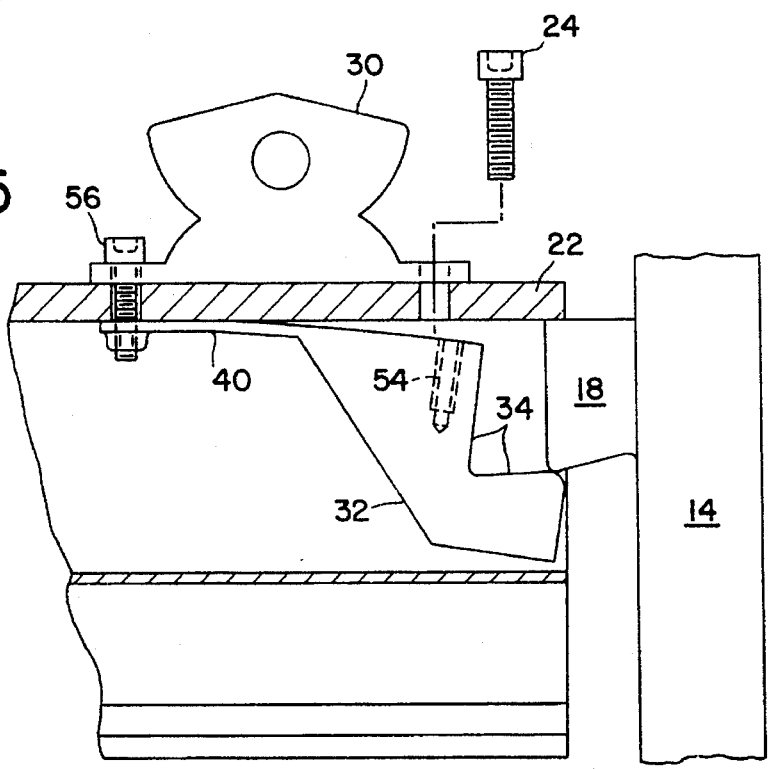
FIG. 5 conceptionally illustrates the operation of the device of FIG. 4.

Typically, drive elements 30 for the heddle frames 10 are disposed at some position along the top of the heddle frames. For example, drive element 30 may be formed at the extreme end of end brace 14, as particularly seen in FIG. 2, or may be disposed along a section of the edge 22 of slat 12. Referring to FIGS. 4 through 6, in the embodiments of the heddle frame wherein the drive element 30 is disposed along the slat 12, typically bolts 24 are used to secure the drive element to the slat 12. With the present invention, the bolt 24 serves the dual purpose of also securing the end brace to the slat by way of the end brace extension foot 18. The end brace is easily and readily separable from slat 12 by simply removing bolt 24 in the embodiment of FIG. 6.

In alternative preferred embodiments of the invention as shown in FIGS. 2 through 5, locking member or bolt 24 secures or fixes extension foot 18 within slat 12 indirectly through means of an independent clamp block 32. Clamp block 32 is preferably formed of aluminum or some other strong lightweight material and has a recess 34 formed therein. Recess 34 essentially defines a receiving space for extension foot 18, as is particularly seen in the series of FIG. 3. Preferably, recess 34 includes at least one slanted or angled surface 36 which essentially matches surface 38 of foot 18. Depending upon the shape of foot 18, recess 34 can take on any manner of corresponding shape. Clamp block 32 includes a threaded bolt hole 54 defined therein for receipt of the threaded bolt 24.

Figure 3A:
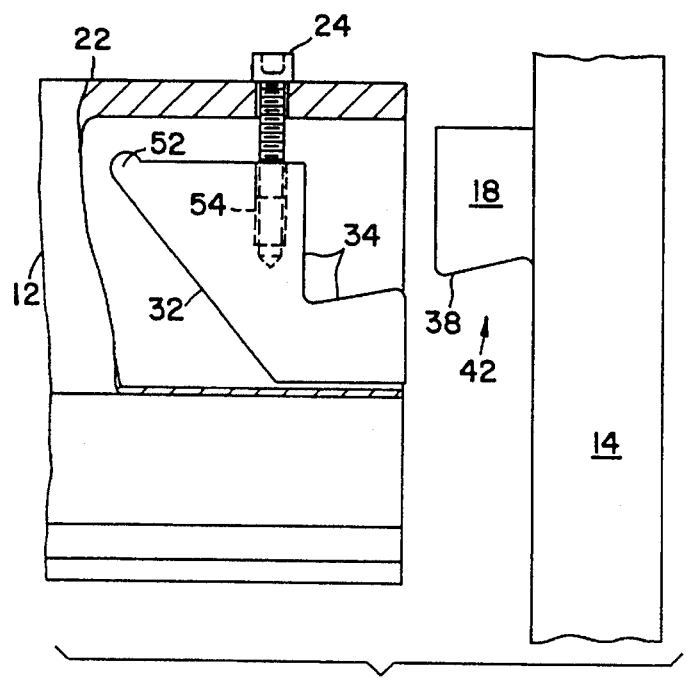
FIGS. 3a through 3c illustrate the sequential operation of the connecting assembly according to the invention.
Figure 3B:
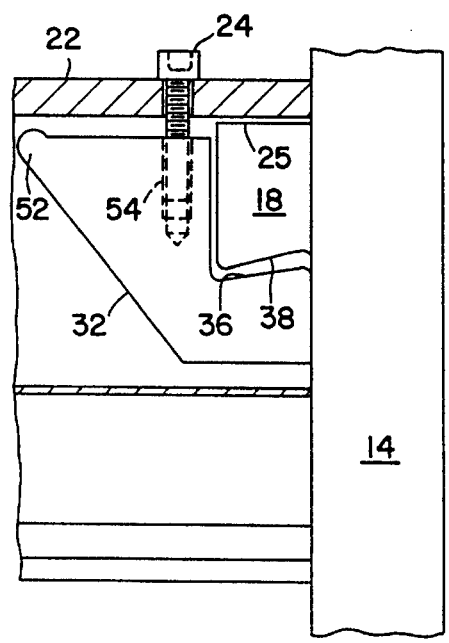
Figure 3C:
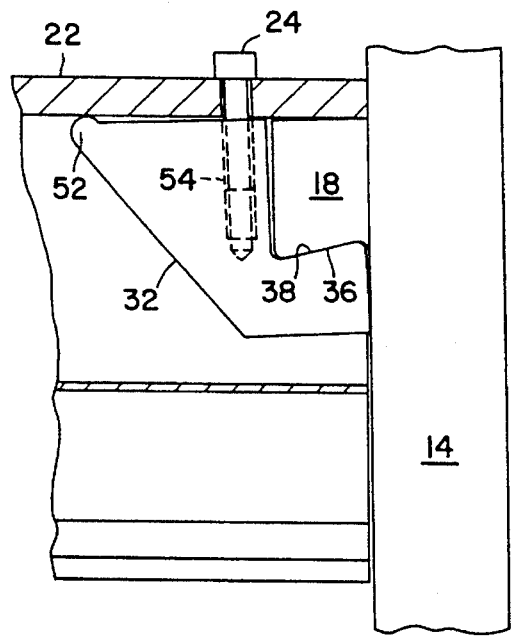

The operation of the clamp block for indirectly securing end brace 14 to slat 12 is particularly illustrated in the series of FIG. 3. FIG. 3a illustrates the end brace 14 separated from slat 12. Bolt 24 is in its loosened or released state so that clamp block 32 is not drawn against the upper edge 22 of slat 12. It should be noted that it is not necessary to completely remove bolt 24 from clamp block 32 in order to remove or separate end brace 14 from slat 12. FIG. 3b illustrates the process of securing the end brace relative to the slat. Extension foot 18 is inserted within opening 16 of the slat so that the top surface of foot 18 generally abuts upper edge 22 of slat 12. Bolt 24 is then tightened which draws clamp block 32 upwards toward edge 22 of slat 12. In so doing, slanted edges 36 and 38 meet and clamp block 32 tends to draw foot 18 upward and inward with respect to slat 12. FIG. 3c illustrates the components in their locked or assembled position. With the clamp block 32 drawn completely against upper edge 22, foot 18 is secured within recess 34 of the clamp lock and securely held within slat 12. The slanted edges 38 and 36 prevent end brace 14 from being pulled away from slat 12.

It should be understood that the invention would still function without the slanted surfaces 38 and 36 but would be less reliable. For example, if the engaging surfaces between the foot 18 and clamp block 32 were completely horizontal, end brace 14 would still be fixed to slat 12 by the action of clamp block 32 forcing the foot against upper edge 22 of the slat. However, end brace 14 might be separated or pulled apart from slat 12 in this arrangement since a locking or engagement surface is not provided. Thus, it is preferred to provide foot 18 with a locking engagement surface and to define a recess within the clamp block 32 matching the locking engaging surface of the foot. For example, foot 18 may be defined as a dove tail with recess 34 being defined as a complimenting dove tail recess. In this manner, the foot, and thus end brace, is secured relative to slat 12 and end brace 14 cannot be laterally pulled away from slat 12.

Preferably, clamp block 32 also includes a rocker point 52 defined along the top surface thereof. Referring particularly to the series of FIG. 3, it is illustrated that rocker point 52 provides a pivot point for the clamp block wherein as the block 32 is pulled upwardly by means of tightening bolt 24, the clamp block 32 tends to rotate to a degree about rocker 0.52. This action causes the clamp block 32 to cant within the slat 12 and thereby pulls extension foot 18 inwardly within recess 16 of slat 12.

As mentioned above, with the embodiment of the invention utilizing the clamp block 32 as described, locking member 24 may also comprise the bolt or locking member utilized to secure a drive element 30 along the edge of slat 12. Referring particularly to FIGS. 4 and 5, bolt 24 extends through an extension of drive element 30, through the edge 22 of slat 12, and into the threaded hole 54 defined within clamp block 32. In the embodiment illustrated, clamp block 32 may further comprise a relatively long thin and flexible component 40. By way of element 40, clamp block 10 is more or less permanently secured to upper edge 22 while still allowing separation of end brace 14 from slat 12 by still only loosening or removing the single locking member 24. Element 40 provides enough flexibility to allow the clamp block 32 to have a degree of vertical movement within recess 16 whereby extension foot 18 can be pulled away from recess 34, as particularly shown in FIG. 5. This arrangement may be preferred when, for example, two bolts 24, 56 are utilized to secure drive element 30 to slat 12. In any event, end brace 14 is still separable from slat 12 merely by loosening the single locking member.

Figure 7:
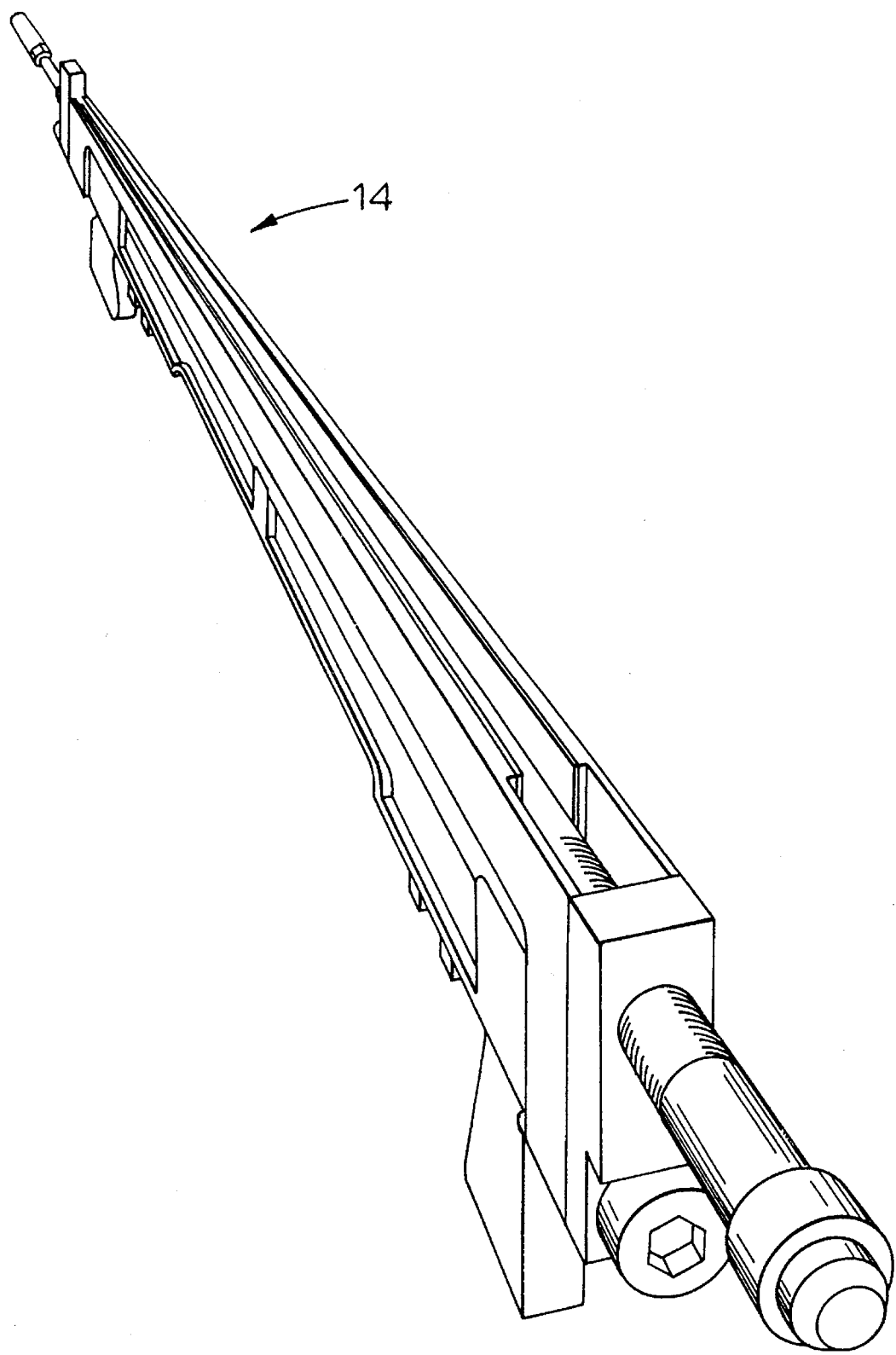
FIG. 7 is a perspective view of a prior art endbrace assembly.
Figure 8:
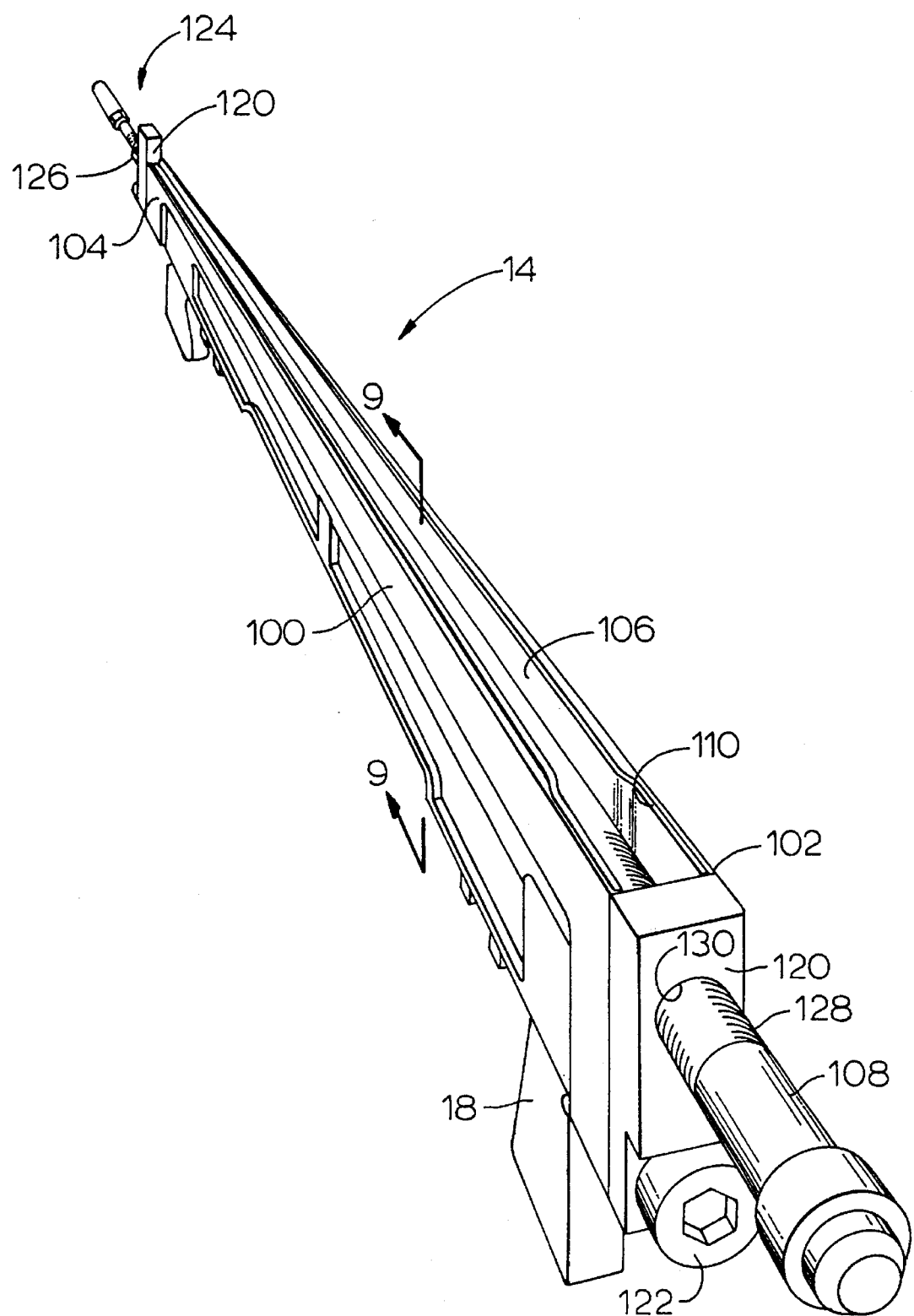
FIG. 8 is a perspective view of the present inventive endbrace assembly.
Figure 9:
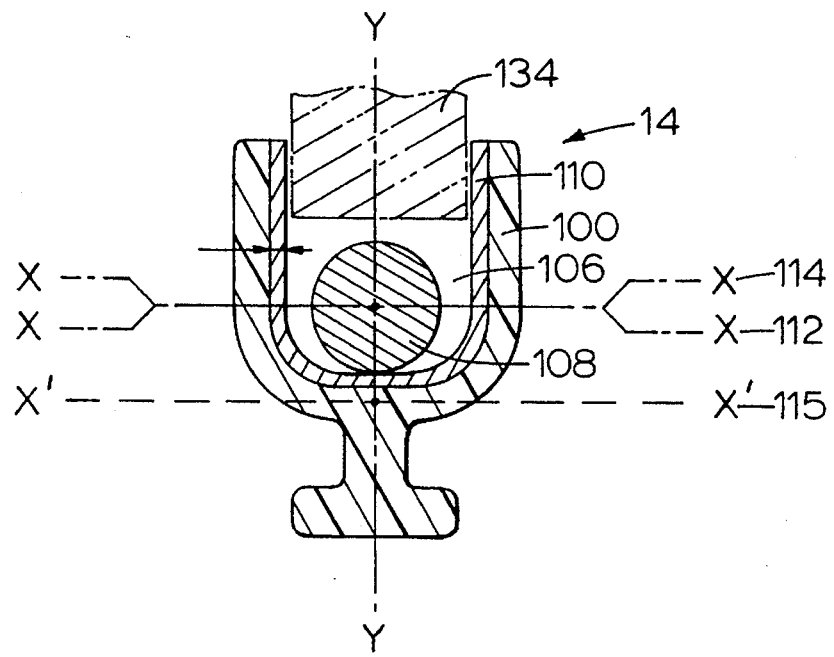
FIG. 9 is a cross-sectional view of the endbrace assembly of FIG. 8 taken along the lines indicated.
Figure 10:
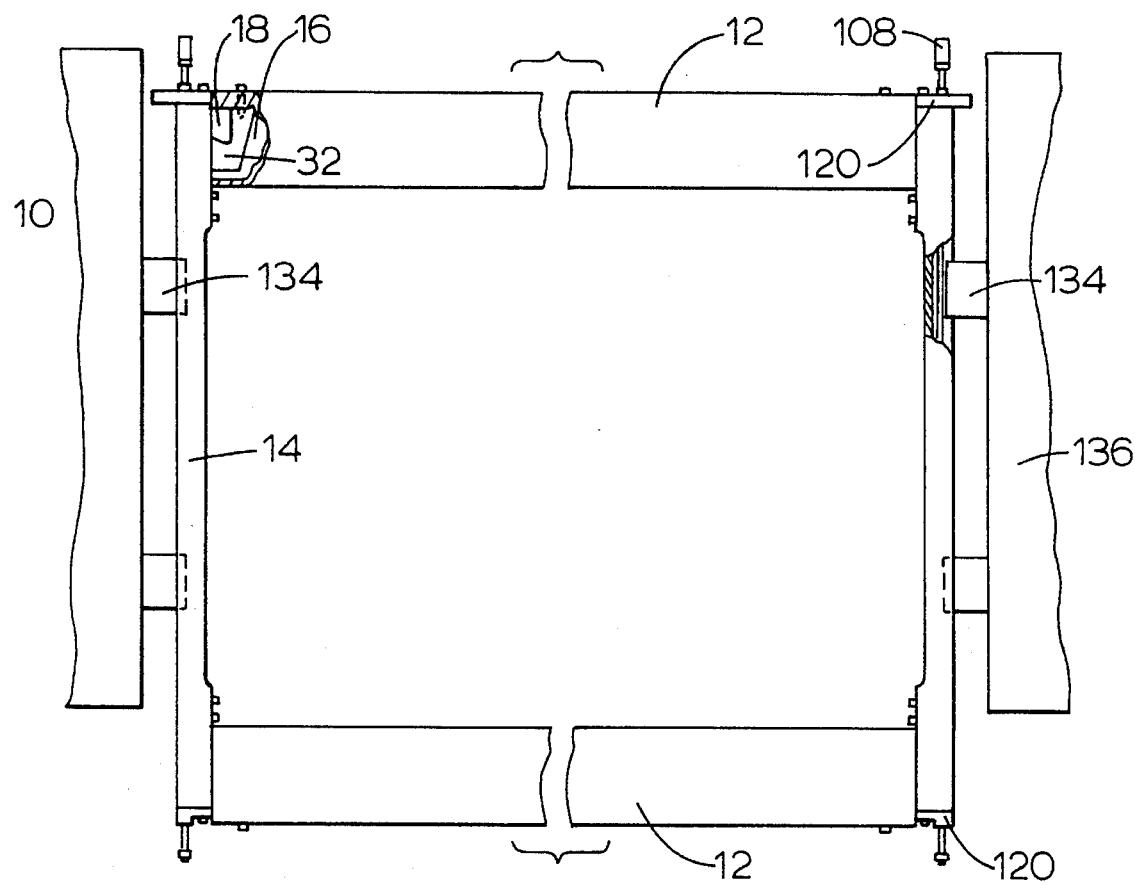
FIG. 10 is a partial component view of a heddle frame assembly incorporating the endbrace assembly of FIG. 8.

Another preferred embodiment of the present invention is illustrated in FIGS. 8 through 10. Generally, this embodiment relates to an improved endbrace assembly which corrects a significant drawback with conventional endbraces. With certain heddle frame configurations, the frame is driven by means of a drive bolt which extends through the endbrace assembly. A typical drive bolt assembly is the DRC-3 bolt assembly, which is commonly known and extensively used in the art. The conventional drive bolt assembly can be clearly seen in FIGS. 7 and 8. The drive bolt itself is disposed n a channel defined longitudinally through the body of the endbrace. It is preferred to pre-load the bolt anywhere from four to five Nm (Newton-meters). However, with conventional endbraces, it has proven virtually impossible to pre-load the bolts to the desired degree because such pre-loading results in significant bowing and distortion of the endbrace. Since the state of the art has turned to lightweight composite-type materials, such as a fiber composite material, for forming the endbraces, the stiffness of the endbraces is less than that of the older conventional endbraces. Accordingly, with such conventional endbraces, it has only been possible to pre-load the drive bolt to around two Nm, which has resulted in less efficient wear and operation of the heddle frame.

As is understood in the art, the endbraces are guided in their vertical movement by way of teeth which run generally in the longitudinal channel defined in the endbrace. Conventionally, a relatively thin metal insert was provided in the channel to provide a wear surface between the guide teeth and the channel, as seen in FIG. 7. This insert, however, did not extend along the entire length of the channel and did not absorb any of the pre-load placed upon the drive bolt.

The present inventive endbrace assembly is a significant improvement over the prior art assembly depicted in FIG. 7, and virtually eliminates the distortion and bowing problem noted with the conventional endbraces. Endbrace 14 includes an elongated body 100 having a channel 106 defined therein. Body 100 is formed preferably of a lightweight plastic material, such as a fiber composite material. Endbrace 14 also includes a continuous insert 110 disposed in channel 106. Insert 110 extends from one end 102 to the other end 104 of the body 100. Insert 110 may be molded, bonded, press fitted, ultrasonically welded, or otherwise fitted into body 100. Insert 110 is formed of a material having a greater stiffness characteristic than the material forming body 100. For example, insert 110 is preferably formed of steel. It is an important feature of the invention that insert 110 extend from one end of the body to the other so as to contact mounting brackets 120. In this manner, as will be explained below, upon tightening or pre-loading drive bolt 108, the tension forces are transmitted directly to insert 110 through mounting brackets 120.

Referring particularly to FIGS. 8 and 9, it is an important feature of the invention that endbrace 14 have an overall longitudinal balanced moment axis 114 through channel 106. This balanced movement axis may also be thought of as an axis through the centroids of the infinitesimally thin cross-sections of the endbrace. In this manner, the balanced moment axis of the endbrace coincides or is coaxial with the longitudinal centerline axis 112 of a drive bolt 108 which may be disposed through channel 106. This arrangement is generally illustrated in FIG. 9, wherein axis 114 of endbrace 14 is shown coaxial with longitudinal centerline 112 of bolt 108. Axis 115 depicts the moment axis of endbrace 14 without insert 110. In essence, this is also the moment axis of conventional prior art endbraces, such as the one depicted in FIG. 7. Insert 110 has a weight so as to shift the overall moment axis of endbrace 14 into channel 106 so as to correspond essentially with the longitudinal centerline of a bolt 108 which may be disposed through the channel. In this manner, upon pre-tensioning of the bolt, the tension forces are transmitted directly along the balanced moment axis of the endbrace and will thus not cause a bowing moment to be generated between the bolt and the endbrace. For example, if the moment axis of endbrace 14 was at position 115 as shown in FIG. 9, a bowing moment would be generated between axis 112 of bolt 108 and moment axis 114 of the endbrace.

Thus, it is important that insert 110 have a weight so as to shift the balanced moment axis into channel 106 to essentially be coaxial with that of a drive bolt which may extend through the channel. In a preferred embodiment wherein insert 110 is formed of stainless steel, the insert has a thickness of 0.035+/−0.010 inches.

Endbrace 14 also comprises mounting brackets 120 disposed at each end of body 100. Insert 110 is disposed between and in contact with the mounting brackets. At least one of the mounting brackets 120 includes a threaded hole 130 for threaded engagement with threads 128 of drive bolt 180. The other mounting bracket 120 at end 104 of endbrace 14 comprises an unthreaded hole through which drive bolt 108 extends. A tensioning mechanism 124 is provided to pre-load or pre-tension drive bolt 108. As is commonly understood in the art, tensioning mechanism 124 may comprise a locking nut 126 which threaddedly engages the drive bolt. Upon turning of nut 126, a pre-load is placed upon bolt 108. The operation and configuration of the drive bolt assembly is well understood in the art, and a detailed description thereof is not necessary for purposes of the present disclosure.

An important feature of the invention is, however, that insert 110 extends from one end of the endbrace to the other so as to be in contact with mounting brackets 120. In this manner, upon pre-loading of bolt 108, the forces are transmitted through brackets 102 directly to insert 110. Insert 110 is formed of a material, such as steel, having a greater stiffness characteristic than that of body 100.

Thus, the present inventive endbrace depicted in FIGS. 8 and 9 overcomes the significant bowing and distortion problem of the prior art endbraces. The combination of the insert having a greater stiffness than the lightweight body of the endbrace; the insert extending from one mounting bracket to the other so as to directly absorb the pre-tension forces placed upon the drive bolt; and the overall balanced moment axis of the endbrace lying within the channel provides a significantly improved endbrace assembly.

FIG. 10 illustrates the endbrace assembly shown in FIGS. 8 and 9 in use with a heddle frame 10. FIG. 10 particularly illustrates guide teeth 134 attached to part of machine frame 136 extending into channel 106. Guide teeth 134 guide the heddle frame in its vertical movement. The guide teeth slide within channel 106. Thus, insert 110 also serves as a wear surface for guide teeth 134.

The inventive endbrace assembly may also incorporate the features of the releasable endbrace discussed above. For example, endbrace 14 may include an elongated foot 18 which engages with clamp block 32 within opening 16 of slat 12. The operation of this device has already been described.

It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

What is claimed is:

1. A heddle frame endbrace, said endbrace comprising an elongated body having opposite ends and formed of a first material, said body having a longitudinal channel defined therein along the length of said body, said channel configured for receipt of a drive bolt through said endbrace, said endbrace further comprising a continuous insert fitted into and essentially lining said channel from one said end to the other said end of said body, said insert formed of a second material having a greater stiffness than said first material and a weight so that said endbrace has an overall longitudinal balanced moment axis through said channel so as to be essentially coaxial with a longitudinal centerline axis of a drive bolt which may be disposed through said channel, wherein upon tensioning of a drive bolt disposed through said channel said endbrace is prevented from bowing.

2. The heddle frame endbrace as in claim 1, wherein said body is formed of a fiber reinforced composite material.

3. The heddle frame endbrace as in claim 1, wherein said insert is formed of steel.

4. The heddle frame endbrace as in claim 1, wherein said channel comprises a generally U-shaped profile defined in said body, said insert comprising a generally U-shaped profile complimenting that of said channel.

5. The heddle frame endbrace as in claim 1, further comprising removable mounting brackets disposed at each said end of said body, said insert disposed essentially between and in contact with said mounting brackets, said mounting brackets configured for receipt of a drive bolt therethrough.

6. The heddle frame endbrace as in claim 5, further comprising a drive bolt disposed through said channel and extending beyond said mounting brackets.

7. The heddle frame endbrace as in claim 6, wherein said drive bolt further comprises a tensioning mechanism for placing said bolt under a preset tension, said tension being transferred to said insert through said mounting brackets.

8. The heddle frame endbrace as in claim 1, further comprising an essentially perpendicularly extending extension foot configured adjacent each said end of said endbrace, said extension feet configured to slide into openings of slats of a heddle frame.

9. The heddle frame endbrace as in claim 8, wherein said extension feet are formed integral with said body.

10. A heddle frame, said heddle frame comprising:

a pair of laterally extending slats;

a pair of oppositely facing end braces attached to said slats to define therewith a rectangular said heddle frame, each of said end braces further comprising an elongated body having opposite ends and formed of a first material;

mounting brackets disposed adjacent each said end of said body;

a longitudinal channel defined in said body along the length thereof, said channel configured for receipt of a drive bolt through said endbrace;

an insert fitted into said channel, said insert extending between and in contact with said mounting brackets, said insert formed of a second material having a greater stiffness than that of said first material;

a drive bolt disposed longitudinally within said channel and said insert, said drive bolt variably configured with said mounting brackets so that a pretension can be applied to said drive bolt, said pretension being transferred to said insert through said mounting brackets; and said endbrace having a longitudinal balanced moment axis through said channel which is essentially coaxial with the longitudinal centerline axis of said drive bolt, wherein upon tensioning of said drive bolt said endbrace is prevented from bowing.

11. The heddle frame as in claim 10, wherein said endbrace body is formed of a plastic material and said insert is formed of metal.

12. The heddle frame as in claim 10, wherein said channel comprises a U-shaped recess defined along the length of said body, and said insert comprises a matching U-shaped profile so as to fit within said channel.

13. The heddle frame as in claim 10, further comprising a variable tensioning mechanism configured for pre-tensioning said drive bolt to varying degrees.

14. The heddle frame as in claim 10, wherein said endbraces further comprise inwardly extending extension feet adjacent said ends thereof, and said slats comprising elongated openings therein for receipt of said extension feet, and a locking mechanism operably configured to lock each said extension foot within said slats in a locked position and to release said end braces from said slats in a released position.

15. The heddle frame as in claim 14, wherein said locking mechanism comprises an independent clamp block which is slidable within said slat elongated openings, said clamp block defining a locking surface which is mateable with an engagement surface defined on said extension foot in such a manner so that when said clamp block is secured within said slat said clamp block locking surface engages with said extension foot engagement surface locking said end brace to said slat, and a securing device disposed through an outward edge of said slat and configured to secure said extension foot within said slat by engagingly drawing said clamp block towards said outward edge of said slat.

* * * * *